United States Patent [19]

Sterling et al.

[11] Patent Number: 5,441,776
[45] Date of Patent: Aug. 15, 1995

[54] SILICON DIOXIDE BONDING LAYERS AND METHOD

[76] Inventors: Rodney D. Sterling, 2609 Via Masada, Carlsbad, Calif. 92008; Yu-Tai Lee, 8419 Florissant Ct., San Diego, Calif. 92129

[21] Appl. No.: 149,195

[22] Filed: Nov. 8, 1993

[51] Int. Cl.[6] ............................................. G02F 1/135
[52] U.S. Cl. ........................................... 428/1; 359/74
[58] Field of Search .............................. 428/1; 359/74

*Primary Examiner*—Alexander S. Thomas

[57] ABSTRACT

A liquid crystal light valve that has an indium tin oxide (ITO) primary electrode disposed between two silicon dioxide bonding layers. The first bonding layer for bonding the primary electrode to a glass substrate and the second bonding layer for bonding said primary electrode to a hydrogenated amorphous silicon layer. The ITO primary electrode is sputtered which significantly reduces processing time and the silicon dioxide bonding layers allow the primary electrode to be bonded to the glass substrate and the hydrogenated amorphous silicon layer without peeling. For some applications the silicon dioxide bonding layer between the glass substrate and the primary electrode is not necessary.

7 Claims, 2 Drawing Sheets

SILICON DIOXIDE BONDING LAYERS AND METHOD

FIELD OF THE INVENTION

The invention relates to an improved process for manufacturing a liquid crystal light valve that uses silicon dioxide bonding layers.

BACKGROUND OF THE INVENTION

Liquid crystal light valves are an important element in a liquid crystal light valve projector. The liquid crystal light valve or LCLV receives light from a CRT on one side which activates a liquid crystal layer in the LCLV. On the other side of the LCLV a light source directs polarized light through the liquid crystal layer to a mirror behind the liquid crystal layer which in turn reflects the light back through the liquid crystal and out to the projection screen. If a segment of the liquid crystal layer is activated, then it changes the polarization of the light directed through the liquid crystal layer which causes that light to be projected onto the screen. If the liquid crystal layer is not activated then the polarization is not changed and that light will not be directed onto the screen.

The process for manufacturing the liquid crystal light valves involves a number of complicated steps for combining the various layers of the LCLV. The process starts with a BK-7 Glass substrate that has a 1,000 Å layer of indium tin oxide (ITO) deposited on the BK-7 Glass substrate. The ITO is deposited on the substrate by evaporation which requires that the substrate be heated to a temperature of approximately 400° C. before the ITO is deposited. It takes approximately 8 hours to achieve the thickness of 1,000 Å. After the ITO is deposited, the substrates must cool down from the 400° C. temperature before the next layer, which is the hydrogenated amorphous silicon layer ("a-Si:H"), can be deposited on the ITO. The a-Si:H is approximately 25μ thick. This thickness is necessary so that the a-Si:H layer will have the properties necessary to properly respond to the light energy directed at the a-Si:H layer. The amorphous silicon is then mechanically polished before the next layers are deposited on the amorphous silicon.

The process of evaporating the ITO onto the substrate consumes a significant amount of time and energy that adds cost to the process for making the LCLV. If a different process is used in which the ITO layer is sputtered onto the silicon dioxide at room temperature then the ITO deposit time can be reduced to approximately 20 minutes. However, when using ITO deposited by sputtering, the a-Si:H layer peels from the ITO layer during polishing of the a-Si:H film. Also, the ITO layer has a tendency to peel away from the BK-7 Glass substrate. The peeling of the ITO layer from the a-Si:H layer and the substrate causes a lower yield, cosmetic defects in the light valve and generally adds to the cost of the LCLV. Therefore, it would be desirable to use the sputtering process to deposit the ITO layer however, the peeling problem with the a-Si:H layer and with the substrate eliminates any processing efficiency gains made by using the sputtering process to deposit the ITO layer.

SUMMARY OF THE INVENTION

The present invention solves the problem of peeling between the ITO layer and the a-Si:H layer and between the ITO layer and the substrate. It was discovered that the top surface of the sputtered ITO layer was very smooth with a rough surface thickness of only 1–2 Å. When the a-Si:H layer was deposited on the ITO layer, the a-Si:H layer had a tendency to peel because the ITO film was so smooth. During polishing of the a-Si:H layer, mechanical stresses were introduced to the bond between the ITO and the a-Si:H which caused the peeling. There was a similar peeling problem between the BK-7 Glass substrate and the ITO layer. The glass substrate is very flat with a rough surface thickness of approximately 3–7 Å. This smooth surface coupled with the smooth surface of the ITO layer caused some peeling between the substrate and the ITO layer although the peeling problem was not as severe as between the ITO layer and the a-Si:H layer. To solve these problems, a thin layer of silicon dioxide, approximately 350 Å thick, was deposited on the BK-7 substrate before the ITO was sputtered onto the substrate and a thin layer of silicon dioxide, approximately 120 Å thick, was deposited on the ITO layer before the amorphous silicon layer was deposited. This gave a rougher surface to both sides of the ITO which now has a rough surface thickness between 17–27 Å thick. These rough surfaces provide good bonding areas on both sides of the ITO layer. The $SiO_2$ bonding layer forms a good chemical bond between the a-Si:H layer and the ITO layer and therefore provides a good "glue" to hold the a-Si:H film and the ITO film together. It also increases the shear resistance which is important when the a-Si:H layer is being mechanically polished. In a similar manner, the $SiO_2$ bonding layer between the glass substrate and the ITO forms a good chemical bond between the ITO and the substrate. The substrate is made from silicon dioxide which bonds well with the silicon dioxide bonding layer. The rough surface on the $SiO_2$ layer makes for a good mechanical bond when the ITO is sputtered onto the $SiO_2$ layer. Again, the shear resistance of the bond between the $SiO_2$ bonding layer and the ITO is increased because of the 17–27 Å rough surface thickness on which the ITO is sputtered.

The $SiO_2$ bonding layers provide for improved adhesion between the ITO layer and both the substrate and the a-Si:H layer and it allows the use of a sputtered ITO process which produces faster process cycle times. The ITO process and the use of the silicon dioxide bonding layers also reduces per part costs significantly. The $SiO_2$ and the ITO layers can be deposited in the same machine using the same process chamber without breaking a vacuum.

Therefore, it is an object of the present invention to provide bonding layers between the ITO layer and both the substrate and the a-Si:H layer so that when a sputtered ITO process is used, the ITO layer will be securely bonded to the substrate and the a-Si:H layer. It is another object to increase in process yield as well as to decrease the cycle time both of which are important factors in reducing per part costs.

These and other objects, features and advantages of the described invention together with the making of the invention will be understood by referring to the following detailed description taken together with the drawings.

DESCRIPTION OF THE PREFERRED EMBODIMENT

The present invention is the use of a $SiO_2$ bonding layers between a sputtered ITO layer and an a-Si:H layer and between the sputtered ITO layer and a glass substrate. The $SiO_2$ bonding layer provides a good chemical and mechanical bond between the a-Si:H layer and the ITO layer. Without the $SiO_2$ bonding layer, the a-Si:H layer would peel away from the ITO layer during the mechanical polishing of the a-Si:H layer. Another $SiO_2$ bonding layer is deposited between the BK-7 Glass substrate, or its equivalent, and the ITO which acts as the primary electrode. If the ITO layer is deposited by an evaporation process, then the peeling will not occur because the evaporated ITO layer has a 50-70 Å rough thickness surface which provided sufficient shear resistance so that there was no peeling between the a-Si:H layer and the ITO layer. Also, evaporated ITO, which is evaporated at approximately 400° C., bonds sufficiently with the glass substrate so that there is no peeling at this boundary when the subsequently deposited a-Si:H layer is mechanically polished. The evaporation process, however, required at least eight hours to deposit as well as additional heat up and cool down periods before the other materials could be deposited. By using the $SiO_2$ bonding layers, it is possible to use a sputtered ITO process for depositing the ITO layer which reduces the process of time for the ITO layer from approximately 12 hours to approximately 20 minutes. This advance provides significant increase in product yield as well as a decrease in process time both of which provided a significant reduction in per part costs. The invention will now be discussed in more detail in conjunction with FIGS. 1 and 2.

Figure 1:
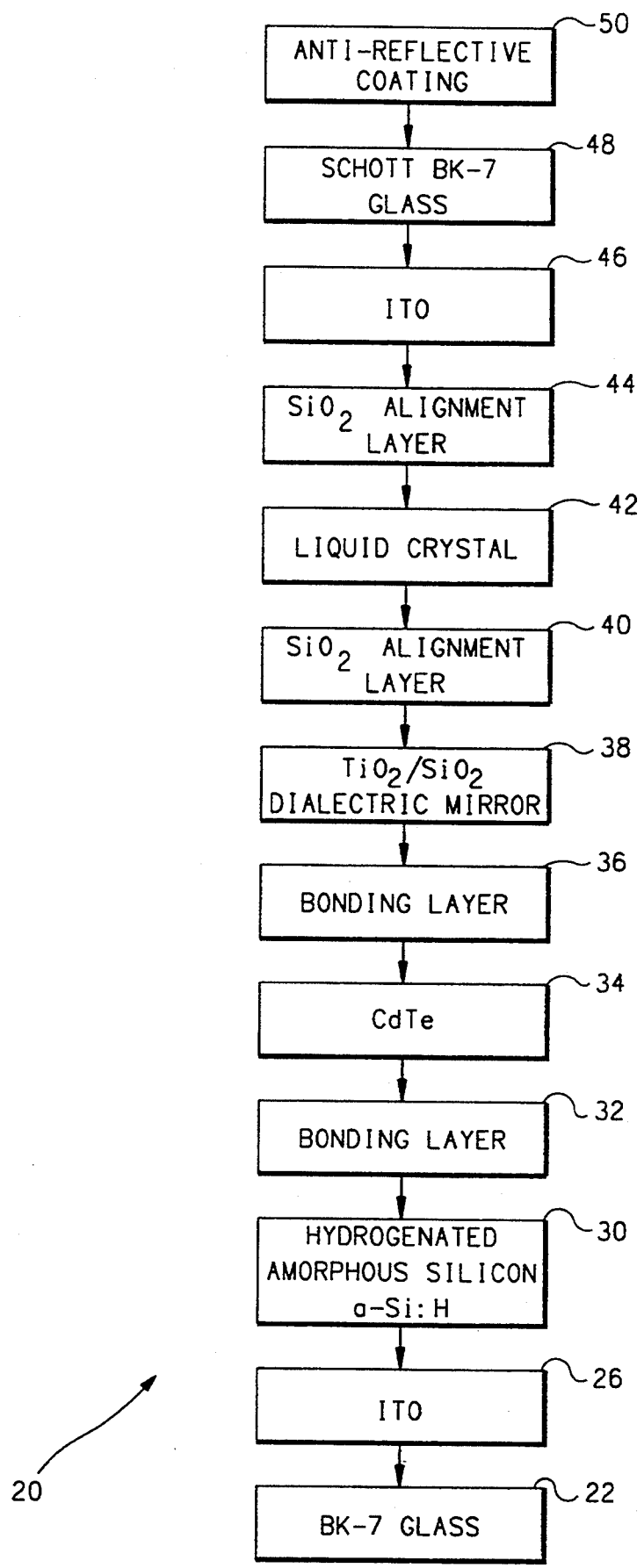
FIG. 1 is a diagram showing a prior art LCLV structure.
Figure 2:
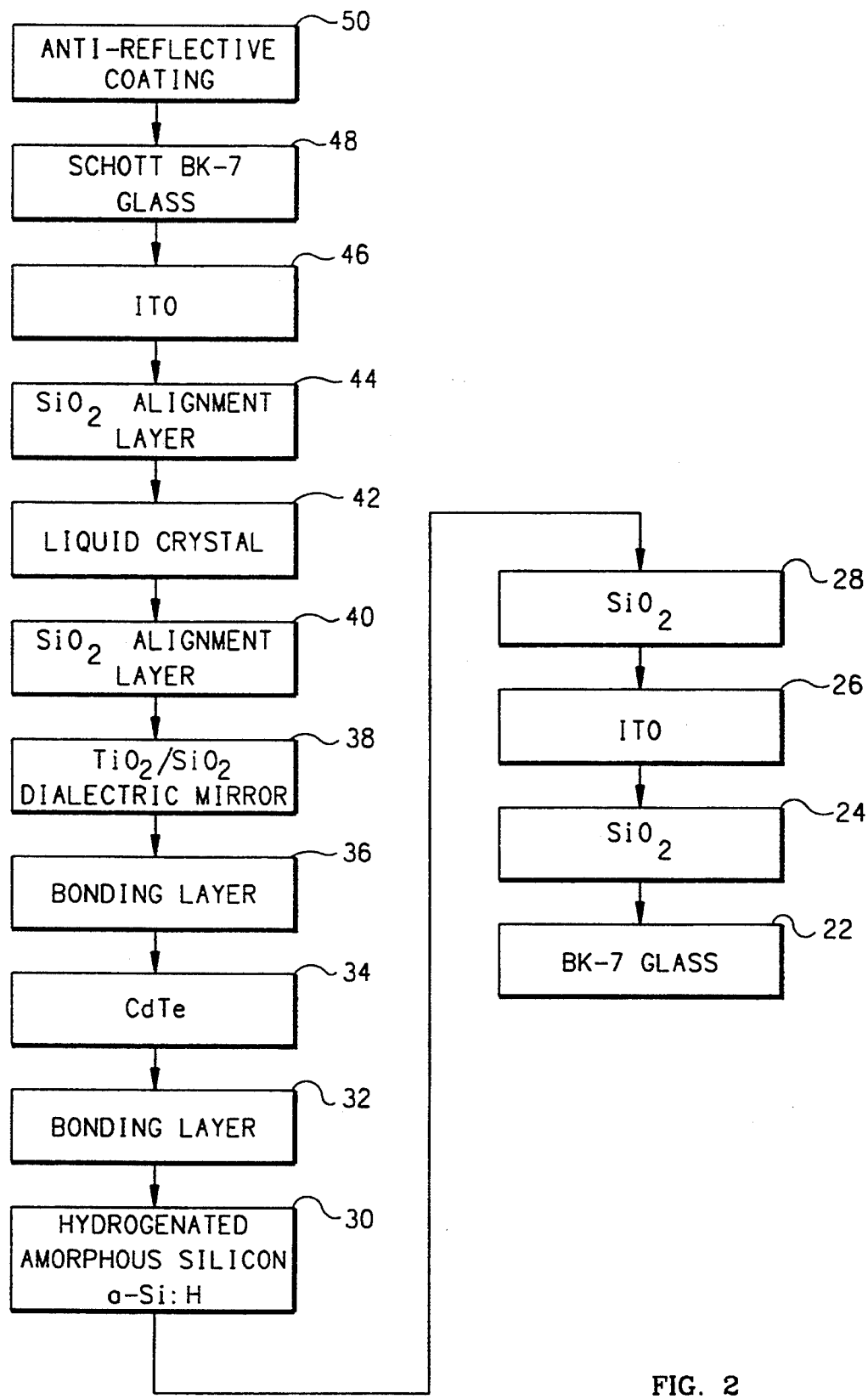
FIG. 2 shows a LCLV structure employing the silicon dioxide bonding layers of the present invention.

FIG. 1 shows the construction of a LCLV 20 on a layer by layer basis. The first layer is a BK-7 Glass substrate 22 that is approximately ¼" thick. On top of the substrate 22 is deposited an ITO layer that is approximately 1,000 Å thick. In the past, this layer was deposited by evaporation at approximately 400° C. The evaporation process took approximately 8 hours plus periods of time to heat up and cool down. Next, the a-Si:H layer 30 is deposited on the ITO layer 26 to a thickness of 25μ. At this point the a-Si:H layer is mechanically polished in preparation for deposition of the next layer.

After polishing, bonding layer 32 is deposited on the a-Si:H layer 30 and a cadmium telluride absorption layer 34 is then deposited on bonding layer 32. The bonding layer 32 acts as an interface between the a-Si:H film 30 and the cadmium telluride film 34. Another bonding layer 36 is deposited on top of layer 34 and a titanium dioxide/silicon dioxide dielectric mirror 38 is deposited on top of bonding layer 36. A liquid crystal alignment layer 40 is then deposited on layer 38.

At this point, the ITO layer 46, which acts as a counter electrode, is deposited on a counter electrode glass substrate 48 which is made from Schott BK-7 Glass or its equivalent. The ITO layer 46 is approximately 1,000 Å. On top of the ITO layer is deposited a silicon dioxide layer 44 which is approximately 1,060 Å thick. The ITO layer 46 is deposited by an outside vendor and it has good adhesion properties both at its boundary with the glass substrate and at its boundary with the silicon dioxide alignment layer 44.

Next, the two silicon dioxide layers 40 and 44 are combined to form a space 42 that will hold the liquid crystal material. The liquid crystal material can be deposited on one of the alignment layers and then sandwiched in. In another method, the liquid crystal space 42 is formed and then a vacuum is draw in space 42. This area is then exposed to a liquid crystal material which is drawn inside the space 42 by the vacuum. The liquid crystal area 42 is then sealed.

Before the present invention it was desired to eliminate the evaporative depositing of the ITO layer 26 because of the relatively large amount of time required for depositing the ITO layer 26. A sputtering process for the ITO layer 26 was selected which could be performed at room temperature in about 20 minutes. However, it was discovered when the ITO layer 26 was deposited by this process, the ITO had a tendency to peel from the substrate 22 and the a-Si:H layer 30 had a tendency to peel and separate from the ITO layer 26 during the mechanical polishing of the a-Si:H layer 30. This loss of yield negated any benefits that may have been gained by saving time using the sputtering process instead of the evaporation process to deposit ITO layer 26.

Upon investigation it was found that the top surface of the evaporated ITO layer 26 had a rough surface thickness of between 50 and 70 Å. This 50-70 Å rough area represents the variation in surface heights from the top surface height to the lowest surface height which is between 50 and 70 Å. This is referred to as the rough surface thickness. It was discovered that the rough surface thickness of the evaporated ITO provided good shear resistance when the next layer 30 was deposited on the ITO layer 26. However, when the sputtering process was used to deposit the ITO film 26, the rough surface thickness of the ITO film 26 was only 1-2 Å. Because of this very flat ITO surface, the two layers had a tendency to separate during the mechanical polishing of the a-Si:H layer 30. This tendency to peel caused cosmetic defects and flaws that reduced the process yield and significantly contributed to per part cost.

In a similar vane it was discovered that evaporative deposition of the ITO layer 26 onto the BK-7 Glass substrate 22 formed a good bond because of the roughness of the evaporated ITO surface.

When the ITO layer 24 was sputtered onto the glass substrate 26 the smooth surface of the ITO combined with the smooth surface of the glass substrate 22 caused the bond between the two layers to peel during the mechanical polishing of the a-Si:H layer 30.

To solve this problem it was determined that silicon dioxide layers 24 and 28 (FIG. 2) should be deposited by sputtering to a thickness of approximately 350 Å and 120 Å respectively. The thickness of layer 24 was selected so that the maximum amount of light is transferred to the a-Si:H layer 30 and at the same time minimizing optical reflection from the interface of the $SiO_2$ layer 24 and the BK-7 Glass layer 22. If it is less than 350 Å thick then it does not provide a rough enough surface for good adhesion to the ITO layer 26. If the layer 28 is thicker than 120 Å then there are problems with peeling between layer 28 and amorphous silicon-layer 30. After depositing the $SiO_2$ layers it was determined that the rough surface thickness of the ITO film on both sides was approximately 17 to 27 Å. These film layers are designated as $SiO_2$ layers 24 and 28 in FIG. 2. After layers 24, 26 and 28 were deposited, a 25μ a-Si:H layer 30 was deposited on the SiO₂ layer 28. After depositing the a-Si:H layer, the parts went through the following tests. A tape pull test, mechanical polishing test and the thermal test. More than three repeat runs with more than a hundred substrates were tested with no substrate failing any of the tests. The finished LCLV optical product was tested electrically and optically and the properties of these parts with the new SiO₂ bonding layers proved that they had equal or better properties than the products that did not contain the new SiO₂ bonding layers. The bonding layer 28 increases the shear resistance of the bond between the ITO layer 26 and the a-Si:H layer 30 and prevents peeling during the mechanical polishing after the deposition of the a-Si:H layer 30. The bonding layer 24 increases the shear resistance of the bond between the BK-7 Glass substrate 22 and the ITO primary electrode layer 26.

Use of a sputtered ITO process instead of an evaporative ITO process decreases the process cycle time by a factor of three. Also, sputtering ITO produces a higher quality film because it has lower particle size and lower particle density. This improvement would not have been possible if not for the use of the SiO₂ bonding layers between the ITO layer 26 and the a-Si:H layer 30 and between the ITO layer 26 and the substrate 22. Therefore, the use of the SiO₂ bonding layers allowed the use of the much more efficient sputtered ITO process because it solved the problem of peeling that caused an unacceptable loss in production yield. These factors increased the throughput because of the faster cycle times and the costs per part was reduced significantly. Another advantage of using the sputtered ITO process is that the initial SiO₂ bonding layer 24 can be deposited along with the ITO layer 26 and the SiO₂ bonding layer 28 through the use of automatic loading and unloading in the same equipment. The SiO₂ bonding layers can be deposited in the same process system that is used to deposit the ITO film 26 without breaking the vacuum. The first SiO₂ bonding layer 24 can be eliminated which will produce some loss of yield due to peeling. This problem can be corrected by etching or mechanical polishing of the BK-7 Glass layer 22. However, during etching or mechanical polishing it is important not to make the surface too rough so as to cause light scattering or a significant reduction in the transmission of incoming light. The purpose of the etching or mechanical polishing is to make the surface of the glass substrate 22 rough. If this surface is rough then when the ITO layer 26 is deposited on the glass substrate the resultant ITO layer will also be rough. While this approach will work, it is more efficient to deposit the SiO₂ layer 24 for the purpose of obtaining a rough surface in which to deposit the ITO layer 26. Again, these advantages ultimately contribute to increased production yield and higher throughput both of which reduce the cost per part.

While the preferred embodiments of the invention have been described above, it will be recognized and understood that various changes and modifications may be made therein and the appended claims are intended to cover all such modifications which may fall within the spirit and scope of this invention.

What is claimed is:

1. A liquid crystal light valve comprising:
   first substrate means and an indium tin oxide primary electrode, said substrate means supporting the said primary electrode;
   a silicon dioxide bonding layer deposited on said primary electrode,
   a hydrogenated amorphous silicon layer deposited on said silicon dioxide layer,
   a dielectric mirror deposited on said hydrogenated amorphous silicon layer,
   a first silicon dioxide alignment layer deposited on said dielectric mirror,
   a second substrate means, said second substrate means having an indium tin oxide counter electrode deposited therein,
   a second silicon dioxide alignment layer deposited on said counter electrode,
   said first and second alignment layers forming the top side and bottom side of a liquid crystal layer,
   said liquid crystal layer adapted to contain liquid crystal material.

2. A liquid crystal light valve as in claim 1 having a silicon dioxide bonding layer disposed between said primary electrode and said first substrate means.

3. The liquid crystal light valve as in claim 2 wherein: said primary electrode is deposited on said substrate means by sputtering.

4. The liquid crystal light valve as in claim 2 further comprising:
   a cadmium telluride absorption layer disposed between said hydrogenated amorphous silicon layer and said dielectric mirror,
   said cadmium telluride absorption layer having bonding layers on either side of said cadmium telluride absorption layer.

5. The liquid crystal light valve of claim 4 wherein: said bonding layers disposed on either side of said cadmium telluride absorption layer have a cadmium telluride layer deposited adjacent each side of said cadmium telluride absorption layer, each bonding layer having a cadmium telluride oxide layer disposed adjacent each cadmium telluride bonding layer and said bonding layers having a silicon dioxide layer deposited adjacent to each cadmium telluride oxide layer.

6. The liquid crystal light valve as in claim 1 further comprising:
   a cadmium telluride absorption layer disposed between said hydrogenated amorphous silicon layer and said dielectric mirror,
   said cadmium telluride absorption layer having bonding layers on either side of said cadmium telluride absorption layer.

7. The liquid crystal light valve of claim 6 wherein: said bonding layers disposed on either side of said cadmium telluride absorption layer have a cadmium telluride layer deposited adjacent each side of said cadmiumtelluride absorption layer, each bonding layer having a cadmium telluride oxide layer disposed adjacent each cadmium telluride bonding layer and said bonding layers having a silicon dioxide layer deposited adjacent to each cadmium telluride oxide layer.

* * * * *

UNITED STATES PATENT AND TRADEMARK OFFICE
CERTIFICATE OF CORRECTION

PATENT NO. : 5,441,776
DATED : August 15, 1995
INVENTOR(S) : R.D. Sterling and Y. Lee It is certified that error appears in the above-indentified patent and that said Letters Patent is hereby corrected as shown below:

Column 3, line 63, after "1000 Å", please insert --thick--.

Column 4, line 36, after "1-2 Å", please insert --thick--.

Column 4, line 66, after "17 to 27 Å", please insert --thick--.

Column 6, line 28, claim 4, please delete "Claim 2", and insert therefor, --Claim 1--.

Column 6, line 46, claim 6, please delete "Claim 2", and insert therefor, --Claim 1--.

Column 6, line 58, claim 7, please delete "cadmiumtelluride", and insert therefor, --cadmium telluride--.

Signed and Sealed this

Second Day of April, 1996

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,441,776
DATED : Aug. 15, 1995
INVENTOR(S) : Rodney D. Sterling, et al.

It is certified that error appears in the above-indentified patent and that said Letters Patent is hereby corrected as shown below:

Column 6, line 28, "Claim 2" should read --Claim 1--
Column 6, line 46, "Claim 1" should read --Claim 2--

Signed and Sealed this

Twenty-first Day of May, 1996

Attest:

BRUCE LEHMAN

*Attesting Officer*         *Commissioner of Patents and Trademarks*

UNITED STATES PATENT AND TRADEMARK OFFICE
CERTIFICATE OF CORRECTION

PATENT NO. : 5,441,776
DATED : August 15, 1995
INVENTOR(S) : Rodney D. Sterling, et. al.

It is certified that error appears in the above-indentified patent and that said Letters Patent is hereby corrected as shown below:

Title page, item [73], Assignee: should read--Hughes-JVC Technology Corporation, Carlsbad, California--.

Signed and Sealed this

Sixth Day of May, 1997

*Attest:*

BRUCE LEHMAN

*Attesting Officer*     *Commissioner of Patents and Trademarks*